US012613011B2

(12) United States Patent
Jacobsen et al.

(10) Patent No.: US 12,613,011 B2
(45) Date of Patent: Apr. 28, 2026

(54) PROTECTIVE SHROUD FOR A VALVE INTEGRATED PRESSURE REGULATOR (VIPR)

(71) Applicants: Brian Jacobsen, Esher (GB); Laurie M. O'Connor, East Aurora, NY (US); Dennis Edward Reid, Scotland (GB); Raj Gupta, West Yorkshire (GB)

(72) Inventors: Brian Jacobsen, Esher (GB); Laurie M. O'Connor, East Aurora, NY (US); Dennis Edward Reid, Scotland (GB); Raj Gupta, West Yorkshire (GB)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 18/853,834

(22) PCT Filed: Jul. 13, 2022

(86) PCT No.: PCT/US2022/036923
§ 371 (c)(1),
(2) Date: Oct. 3, 2024

(87) PCT Pub. No.: WO2024/015052
PCT Pub. Date: Jan. 18, 2024

(65) Prior Publication Data
US 2026/0022803 A1 Jan. 22, 2026

(51) Int. Cl.
*F17C 13/04* (2006.01)

(52) U.S. Cl.
CPC ...... *F17C 13/04* (2013.01); *F17C 2201/0109* (2013.01); *F17C 2201/032* (2013.01);
(Continued)

(58) Field of Classification Search
CPC ............. F17C 13/04; F17C 2201/0109; F17C 2201/032; F17C 2201/058;
(Continued)

(56) References Cited

U.S. PATENT DOCUMENTS 7,237,570 B2 7/2007 Gamard et al.
7,703,821 B2 4/2010 Swain
(Continued)

FOREIGN PATENT DOCUMENTS

DE 10050024 A1 * 5/2001 ............. F16K 1/306
EP 3002498 A1 4/2016
(Continued)

*Primary Examiner* — Jessica Cahill
(74) *Attorney, Agent, or Firm* — Robert J. Hampsch

(57) ABSTRACT

A protective shroud for a valve integrated pressure regulator (VIPR) assembly is provided. The protective shroud includes a main body section, a top section extending from the main body section to form a primary handle with one or more connecting arm sections and a grip section, and a bottom section with an annular collar. The connecting sections and grip section of the primary handle are oriented in
(Continued)

a parallel orientation to the annular collar. The front face of the main body section includes a recessed portion having a first port or opening configured to expose a pressure gauge/display from the VIPR assembly and a second port or opening configured to expose a gas outlet from the VIPR assembly. The top section of the protective shroud also includes a top opening sized to receive a control knob of the VIPR assembly.

8 Claims, 8 Drawing Sheets

(52) U.S. Cl.
CPC .................. *F17C 2201/058* (2013.01); *F17C 2205/0165* (2013.01); *F17C 2205/0329* (2013.01); *F17C 2205/0332* (2013.01); *F17C 2205/0338* (2013.01); *F17C 2250/043* (2013.01)

(58) Field of Classification Search
CPC ........ F17C 2250/043; F17C 2205/0165; F17C 2205/0329; F17C 2205/0332; F17C 2205/0338; Y10T 137/7062; Y10T 137/7043
See application file for complete search history.

(56) References Cited

U.S. PATENT DOCUMENTS

| | | | | |
|---|---|---|---|---|
| 8,002,514 | B2 | 8/2011 | Hagstrom et al. | |
| 8,162,587 | B2 | 4/2012 | Hagstrom et al. | |
| 8,534,312 | B2 | 9/2013 | Burgess et al. | |
| 9,874,312 | B2 | 1/2018 | Frenal et al. | |
| 10,132,448 | B2 * | 11/2018 | Pemberton | F17C 13/06 |
| 2009/0050218 | A1 * | 2/2009 | Burgess | F17C 13/06 137/557 |
| 2015/0027361 | A1 * | 1/2015 | Eyring | G01L 7/166 116/202 |
| 2017/0114961 | A1 * | 4/2017 | Baune | F17C 13/04 |
| 2018/0372275 | A1 * | 12/2018 | Lamiable | F17C 13/04 |
| 2020/0032961 | A1 * | 1/2020 | Volkan | F17C 13/04 |

FOREIGN PATENT DOCUMENTS

| | | | |
|---|---|---|---|
| EP | 3260760 | A1 | 12/2017 |
| EP | 3267092 | A1 | 1/2018 |
| EP | 3531006 | A1 | 8/2019 |
| EP | 3377811 | B1 | 6/2021 |
| JP | 2002061799 | A | 2/2002 |
| WO | 2017/114663 | A1 | 7/2017 |
| WO | 2021/255702 | A1 | 12/2021 |

* cited by examiner

PROTECTIVE SHROUD FOR A VALVE INTEGRATED PRESSURE REGULATOR (VIPR)

CROSS REFERENCE TO RELATED APPLICATIONS

This application claims the benefit of and priority to PCT application serial number PCT/US22/036923 filed on Jul. 13, 2022.

TECHNICAL FIELD

The present invention relates to a protective shroud for a valve integrated pressure regulator (VIPR) typically used with compressed gas cylinders.

BACKGROUND

Methods of providing a low pressure gas flow from a high pressure compressed gas cylinder typically require specially designed gas cylinder packages many of which employ a valve integrated pressure regulator (VIPR) device equipped with a pressure regulated gas outlet (which can be set to discharge at a low pressure) at a fixed gas flow rate. Alternatively, a VIPR device can be designed or configured to provide a pressure regulated flow at two or more discrete gas flow settings.

Most VIPR type devices typically include a protective shroud or cowling designed to protect the VIPR device. Examples of such protective shrouds or cowlings can be seen in the following prior art references: U.S. Pat. Nos.: 7,237,570; 7,703,821; 8,002514; 8,162587; 8,534,312; and 9,874,312; as well as United States Patent Application Publication No.: 2017-114961 and European Patent Application Nos.: EP3002498; EP3377806; EP3267092; EP2715209; EP3531006; and EP3260760.

What is needed, however, are improved ergonomic protective shrouds that minimize the physical footprint of the VIPR assembly while adequately protecting the VIPR device from damage and facilitating ease of transport and use.

SUMMARY OF THE INVENTION

The present invention may be characterized as a protective shroud for a valve integrated pressure regulator (VIPR) assembly configured for use with compressed gas cylinders. The protective shroud comprises: (i) a main body section having a front face with a recessed portion and a curved back face; (ii) a top section extending from the front face to form a primary handle; and (iii) a bottom section with a protective collar.

The present invention may also be characterized as a valve integrated pressure regulator assembly configured to be attached to a compressed gas cylinder along a central axis of the compressed gas cylinder, the valve integrated pressure regulator assembly comprising: (i) a valve integrated pressure regulator having, among other components a valve body; a gas inlet; a gas outlet; a plurality of valves; a pressure regulator; one or more control knobs; and a pressure gauge/display; and (ii) a protective shroud. The protective shroud comprises three sections including a main body section having a front face with a recessed portion and a curved back face; a top section extending from the front face to form a primary handle; and a bottom section with a protective collar.

The recessed portion of the front face has a first port or opening configured to expose a pressure gauge/display from the valve integrated pressure regulator assembly and a second port or opening configured to receive and expose the gas outlet from the valve integrated pressure regulator assembly. The top section of the protective shroud also includes a top opening sized to receive a control knob of the valve integrated pressure regulator assembly. The bottom section has a bottom opening configured to connect the gas inlet to the compressed gas cylinder.

The primary handle of the protective shroud in both characterizations preferably comprises one or more connecting sections and a grip section wherein the grip section is preferably a curved grip section. The one or more connecting sections and the grip section are configured in a planar orientation relative to one another but the one or more connecting sections are also oriented in a generally orthogonal orientation relative to the to the grip section.

The protective shroud also provides a clearance between the curved back face and the primary handle that is sufficient to allow an individual to grasp the primary handle from underneath. As well as a clearance between the control know and the primary handle that is sufficient to allow an individual to grasp the primary handle. In addition, the top opening is sized or configured to allow an individual to easily grasp and turn the control knob of the valve integrated pressure regulator assembly.

The protective shroud further includes a protective collar proximate the bottom section that is preferably an annular collar having a diameter less than a diameter of a compressed gas cylinder to which the valve integrated pressure regulator assembly is attached. In some embodiments of the protective shroud, there is a secondary handle projecting or extending outwardly from a lower portion of front face or outwardly from the protective collar. In addition, some embodiments of the protective shroud may include one or more side openings and one or more removable covers configured to cover the one or more side openings and protect the underlying structure or components of the valve integrated pressure regulator.

BRIEF DESCRIPTION OF THE DRAWINGS

While the specification concludes with one or more claims specifically pointing out the subject matter that Applicants' regard as the invention, it is believed that the claims will be better understood when taken in connection with the accompanying drawing in which:

DETAILED DESCRIPTION

Figure 1:
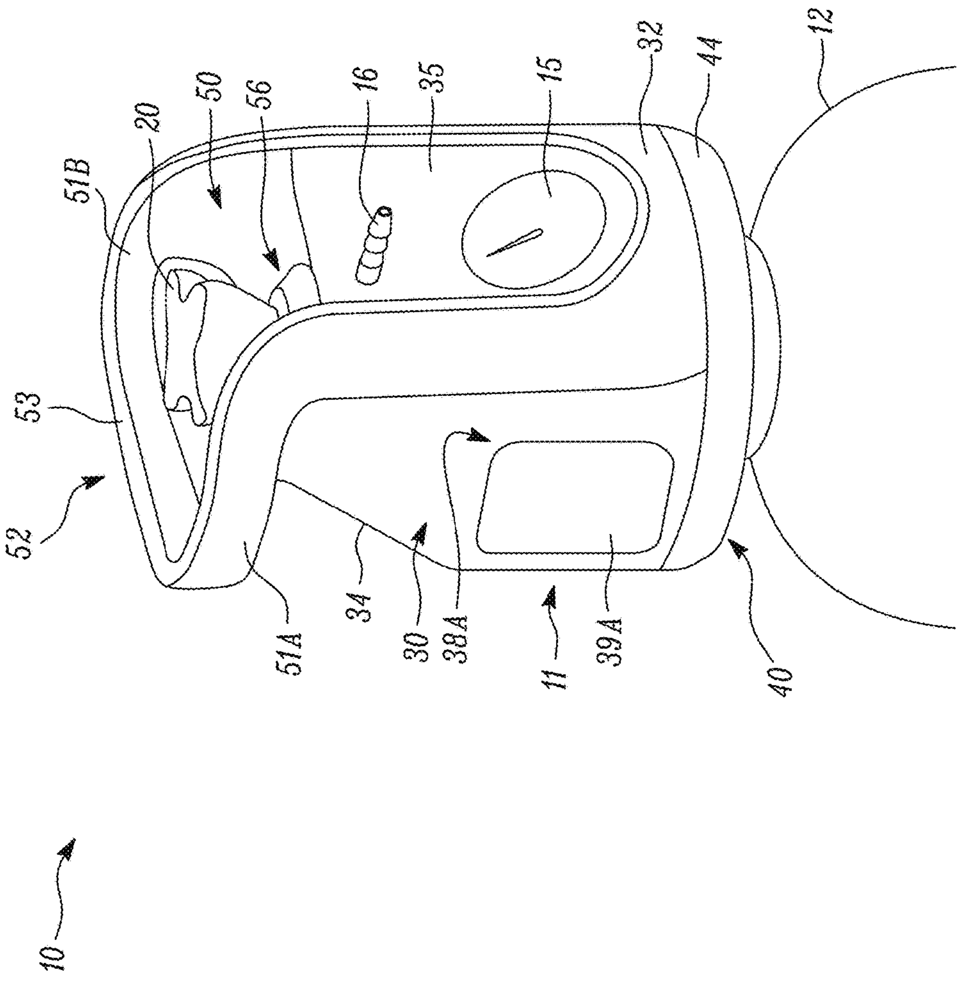
FIG. 1 is a perspective view of an embodiment of a valve integrated pressure regulator assembly with the present protective shroud attached to a compressed gas cylinder.
Figure 2:
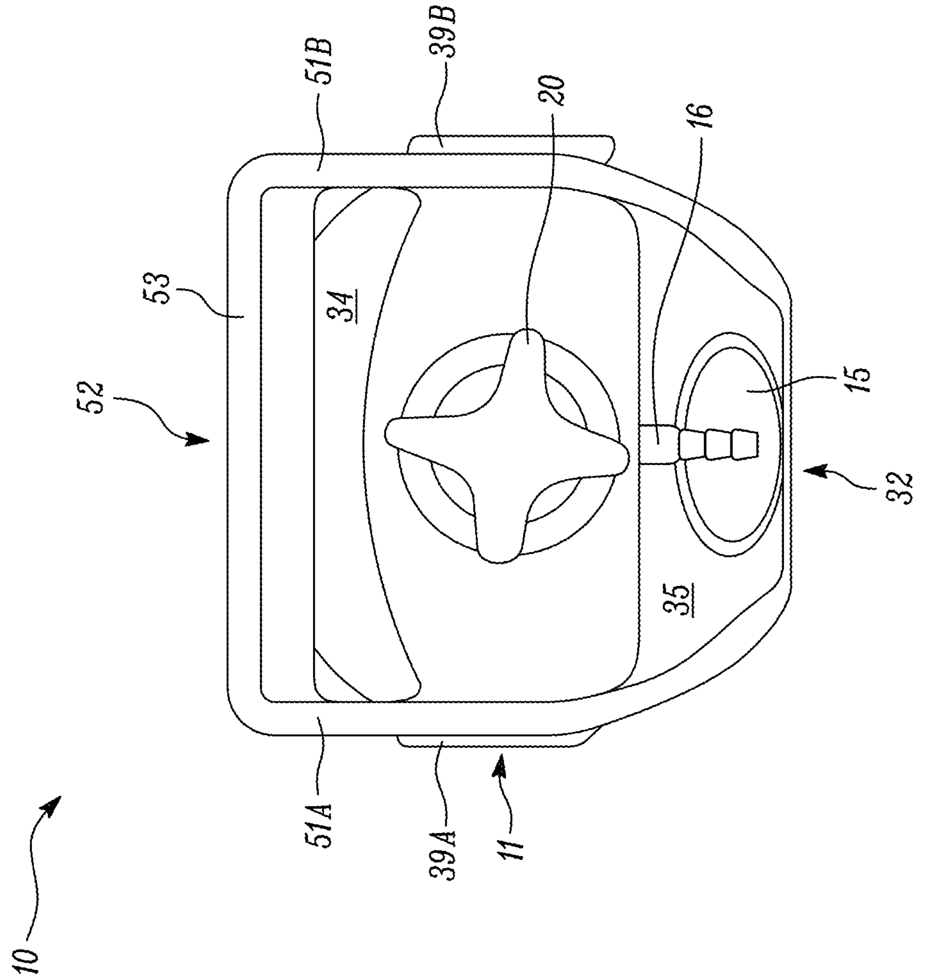
FIG. 2 is a top view of the valve integrated pressure regulator assembly and encased within the protective shroud of FIG. 1.
Figure 3:
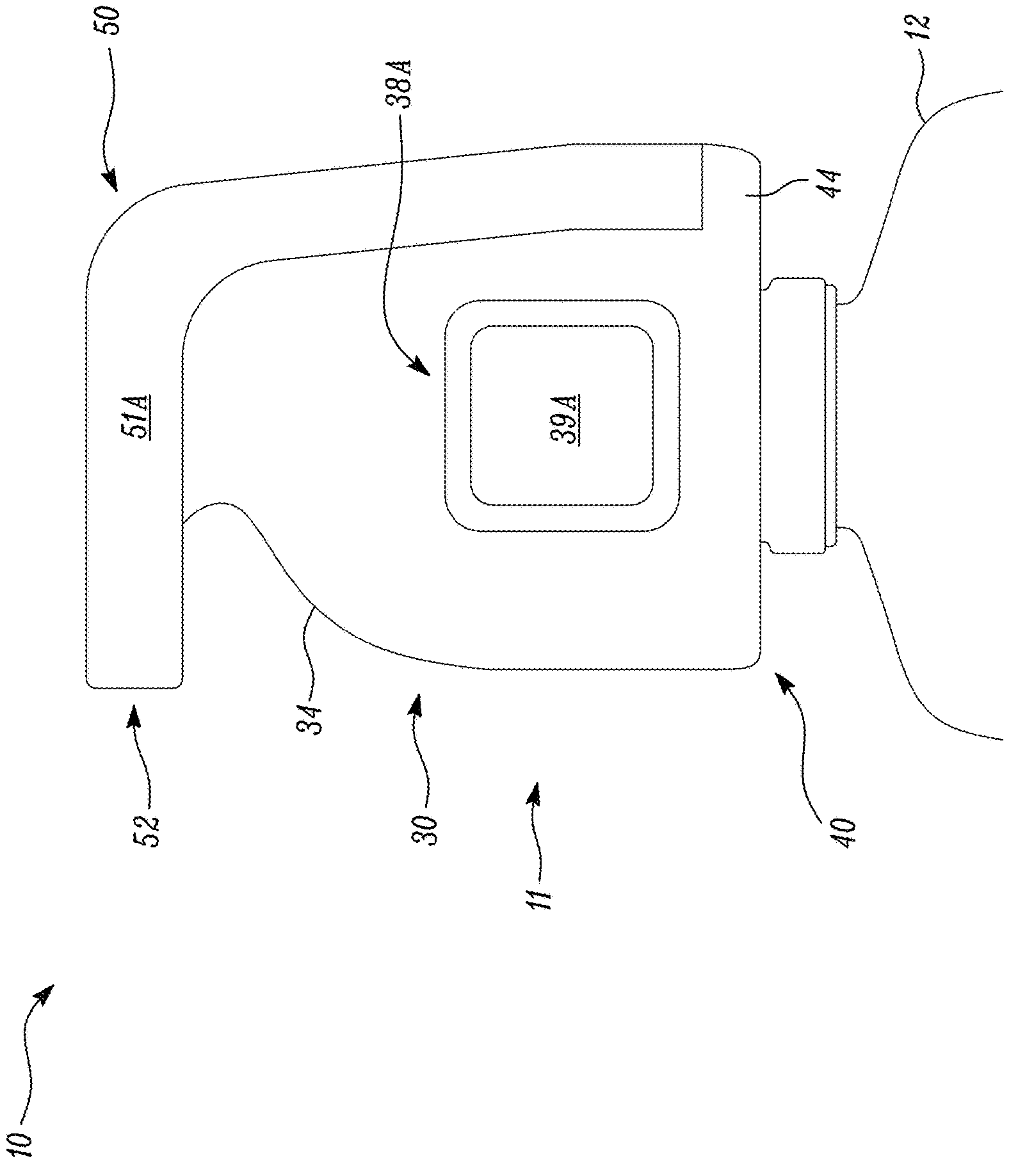
FIG. 3 is a side view of the valve integrated pressure regulator assembly attached to a compressed gas cylinder and encased within the protective shroud of FIG. 1.
Figure 4:
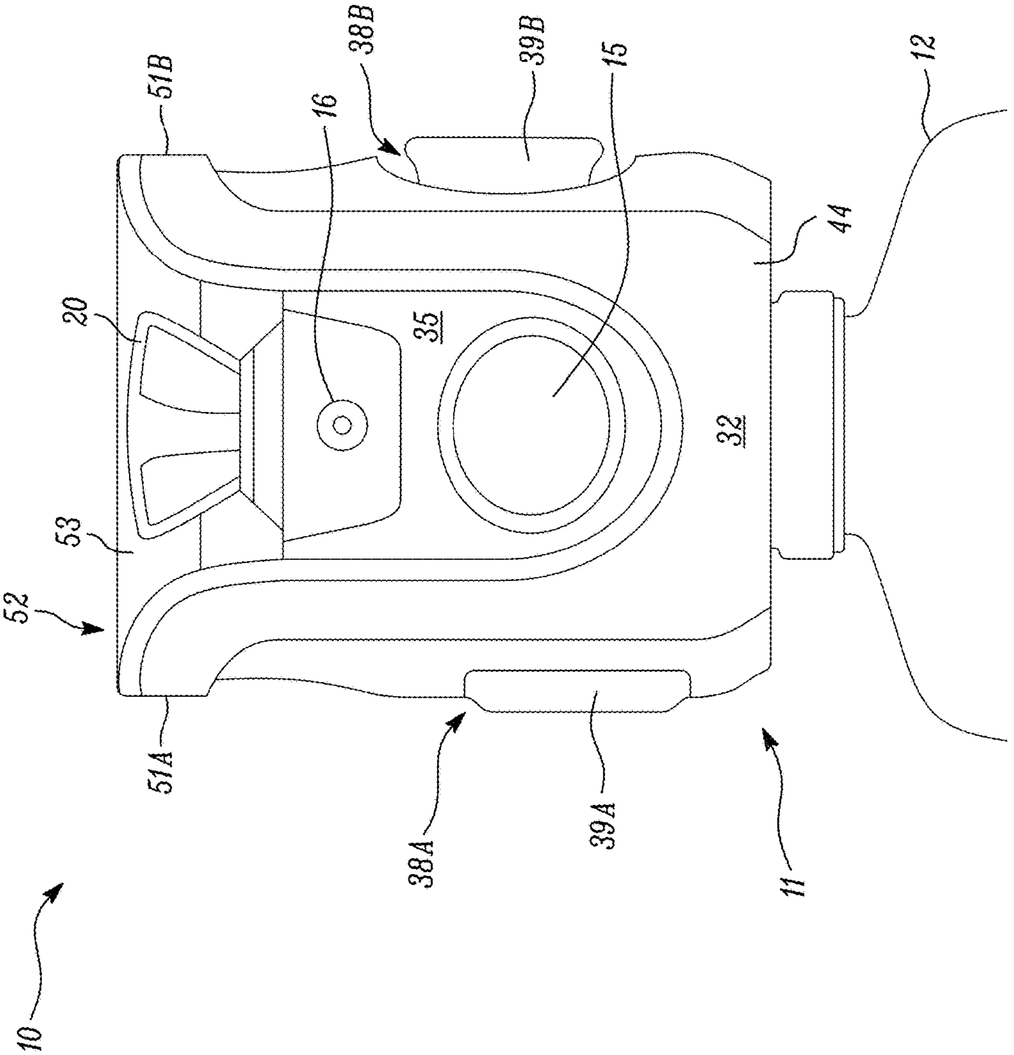
FIG. 4 is a front view of the valve integrated pressure regulator assembly attached to a compressed gas cylinder and encased within the protective shroud of FIG. 1.
Figure 5:
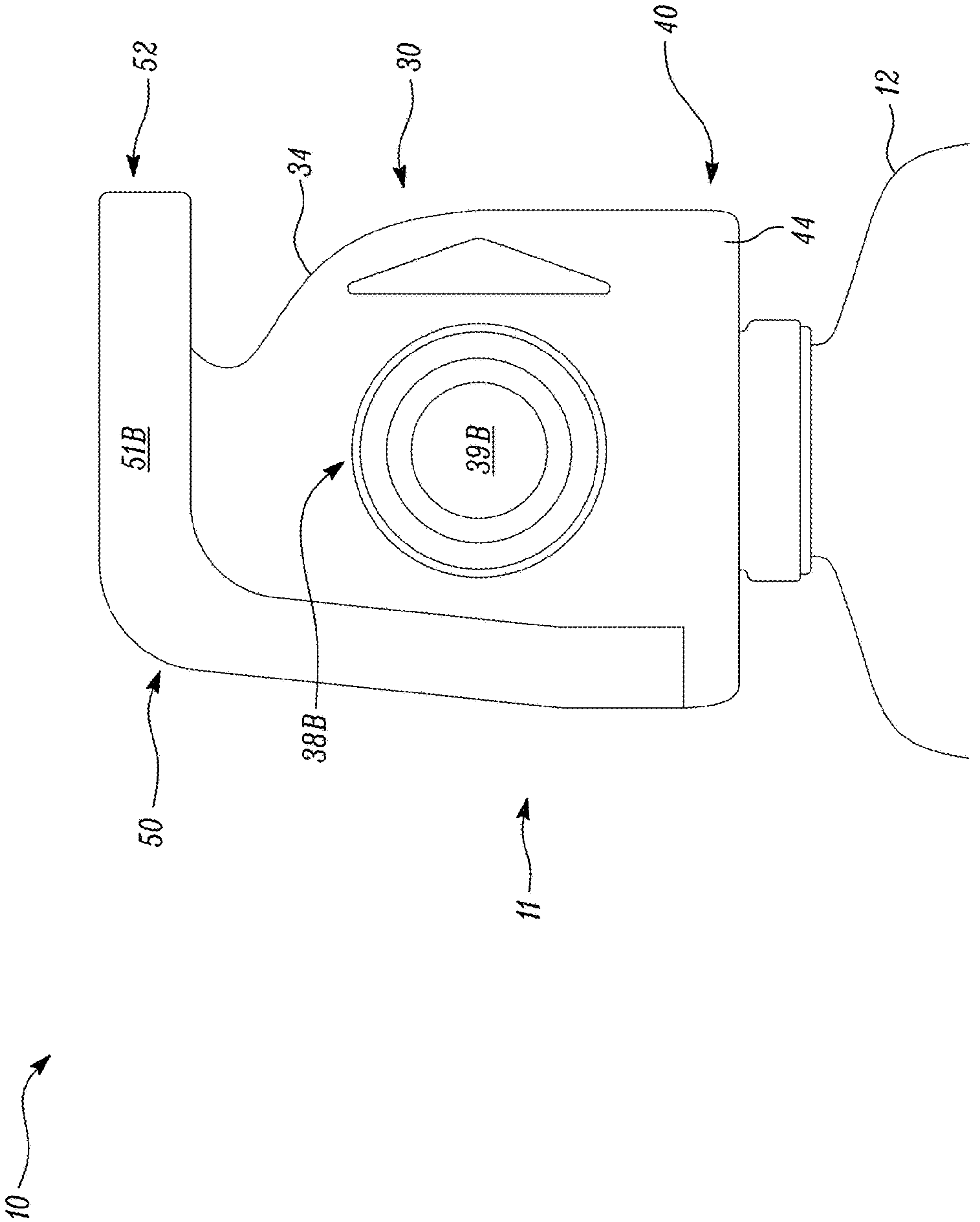
FIG. 5 is another side view of the valve integrated pressure regulator assembly attached to a compressed gas cylinder and encased within the protective shroud of FIG. 1.
Figure 6:
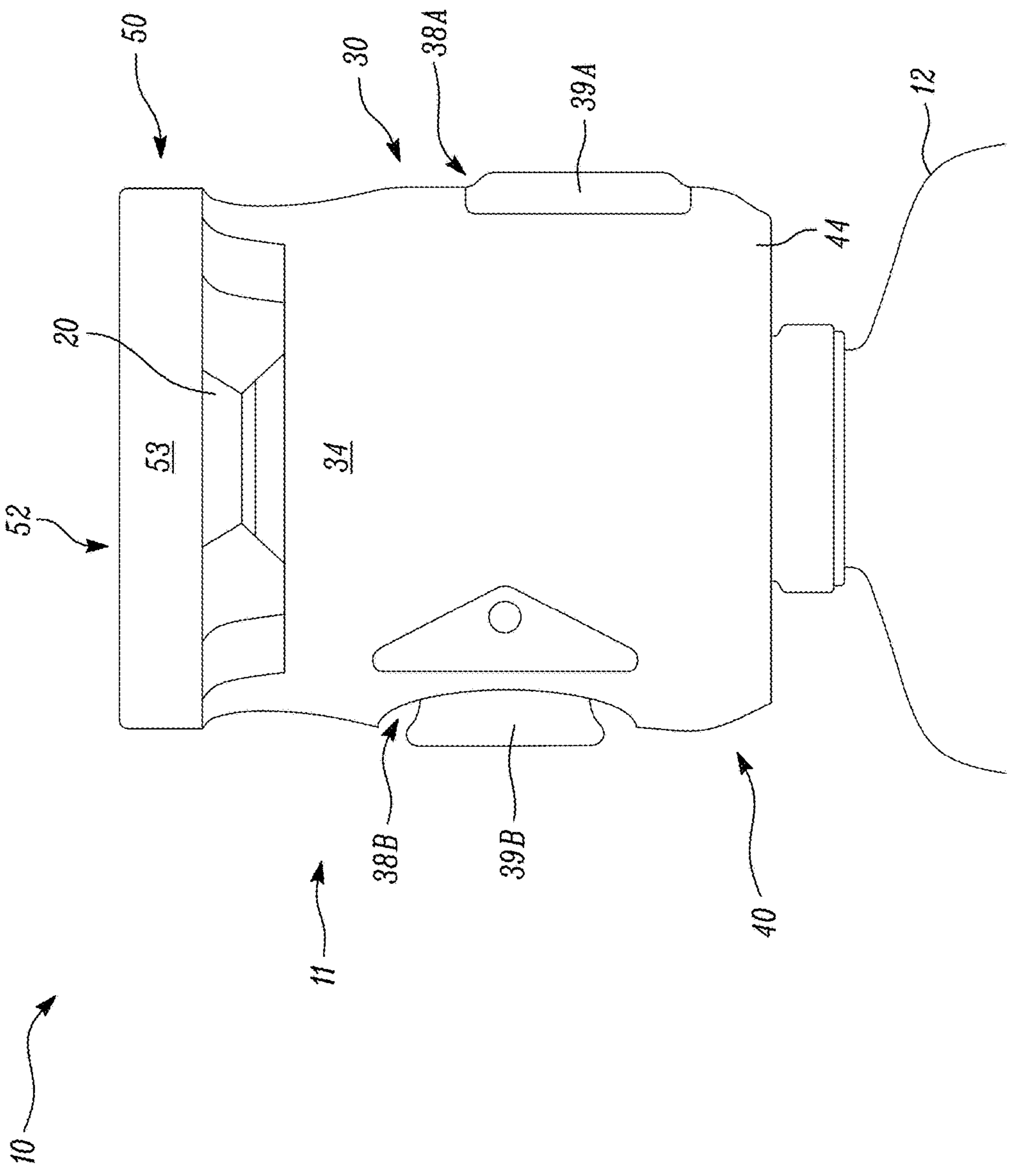
FIG. 6 is a back view of the valve integrated pressure regulator assembly encased within the protective shroud of FIG. 1 and attached to a compressed gas cylinder.

Turning now to FIGS. 1-6 of the drawings, an embodiment of a valve integrated pressure regulator (VIPR) assembly 10 for a pressurized gas cylinder 12 and encased within a protective shroud 11 is shown. When mounted or attached to a compressed gas cylinder 12 the illustrated VIPR assembly 10 with shroud 11 forms a valve integrated pressure regulator based cylinder package. Like many VIPR assemblies, the illustrated VIPR assembly 10 includes: a valve body; a cylinder connection, a plurality of values optionally including an isolation valve, a metering valve, and a pressure relief valve, a pressure regulator, one or more sensors, a controller, a pressure gauge 15; a gas fill port; a gas outlet 16, and a control knob 20 configured to open or close the VIPR assembly 10 and regulate the gas flow from the compressed gas cylinder 12 to the gas inlet and through the VIPR to the gas outlet 16.

The protective shroud 11 includes a main body section 30 having a front face 32 with a recessed space 35. There are one or more openings configured to receive the pressure gauge 15 and the gas outlet 16 disposed on the recessed portion 35. In some embodiments, the opening for the pressure gauge/display may be angled or inclined such that the exposed pressure gauge/display is also at an inclination relative to the central axis of the compressed gas cylinder. Alternatively, in lieu of or in addition to the pressure gauge, the VIPR assembly may include a backlit, digital display that is viewable through an opening in the recessed portion.

The main body section 30 is a generally cylindrical looking shape but having a sculpted upper portion that transitions to the top section 50 and the primary handle 52. In the illustrated embodiment, the primary handle 52 includes one or more connecting sections or arms 51A, 51B and a curved grip section 53 that forms the topmost portion of the protective shroud 11 and is circumferentially or arcuately disposed around the top opening 56 and control knob 20 with sufficient clearance between the grip section 53 of the primary handle 52 and the control knob 20 to allow a user to easily turn the control knob 20 in a clockwise or counterclockwise direction. There is also sufficient clearance between the curved back face 34 of the main body section 30 and the primary handle 52 to easily allow an individual to easily grasp the grip section 53 of primary handle 52 from underneath. The primary handle 52 is oriented in a flat orientation in that it is generally aligned with the top of the control knob 20 along a horizontal plane and preferably does not rise above the top of the control knob 20.

The protective shroud 11 also includes a top section 50 having a primary handle 52 and a bottom section 40 having a protective collar 44. Additional openings on the protective shroud 11 may include a top opening 56 through which the control knob 20 of the VIPR assembly 10 projects, a bottom opening (not shown) where the VIPR assembly 10 is connected to the compressed gas cylinder 12 and one or more side openings 38A, 38B on the main body section 30 configured to access a fill port, a pressure relief valve, quick connect, battery compartment or another feature of the valve integrated pressure regulator. The main body section 30 may also include one or more removeable covers 39A, 39B that are positioned over the side openings 38A, 38B so as to cover the one or more side openings and protect the underlying structure or components of the valve integrated pressure regulator.

The illustrated primary handle 52 includes two parallel connecting arms or connecting sections 51A, 51B and a grip section 53 extending between the two parallel connecting sections 51A, 51B. The grip section 53 is preferably a slightly outwardly curved grip section to allow sufficient clearance between the grip section 53 and the control knob 20 without extending beyond the circumference of the compressed gas cylinder to which the VIPR assembly 10 is attached. Likewise, the top opening 56 of the protective shroud 11 is sized to allow an individual to easily grasp and turn the control knob 20 of the VIPR.

Preferably, the two parallel connecting sections 51A, 51B or arms and the grip section 53 of the primary handle 52 are in a planar orientation relative to one another and form the uppermost part of the protective shroud. As illustrated in the Figs., the parallel connecting sections 51A, 51B or arms are oriented in a generally orthogonal orientation relative to the to the grip section 53. In addition, the two parallel connecting sections 51A, 51B and grip section 53 are constructed in an orthogonal orientation to a central axis of the compressed gas cylinder.

The protective collar 44 is preferably an annular collar having a diameter that less than a diameter of the compressed gas cylinder 12 to which the VIPR assembly 10 is attached. In this manner, the lateral footprint of the VIPR assembly 10 attached to a compressed gas cylinder 12 in a standing position does not exceed the diameter of compressed gas cylinder 12. The protective collar 44 is configured to cover the cylinder connection of the VIPR assembly 10 proximate the bottom opening. Likewise, the generally cylindrical main body section 30 also has a diameter that is preferably less than or equal to the diameter of the compressed gas cylinder 12 to which the VIPR assembly 10 may be attached.

The protective shroud 11 may be comprised or assembled from multiple sections. For example, the illustrated protective shroud 11 preferably comprises two non-symmetrical molded plastic structures attached to one another. However, VIPR assembly 10 together with the protective shroud 11 are designed to be attached and/or removed from the compressed gas cylinder 12 as an integrated assembly.

Figure 7:
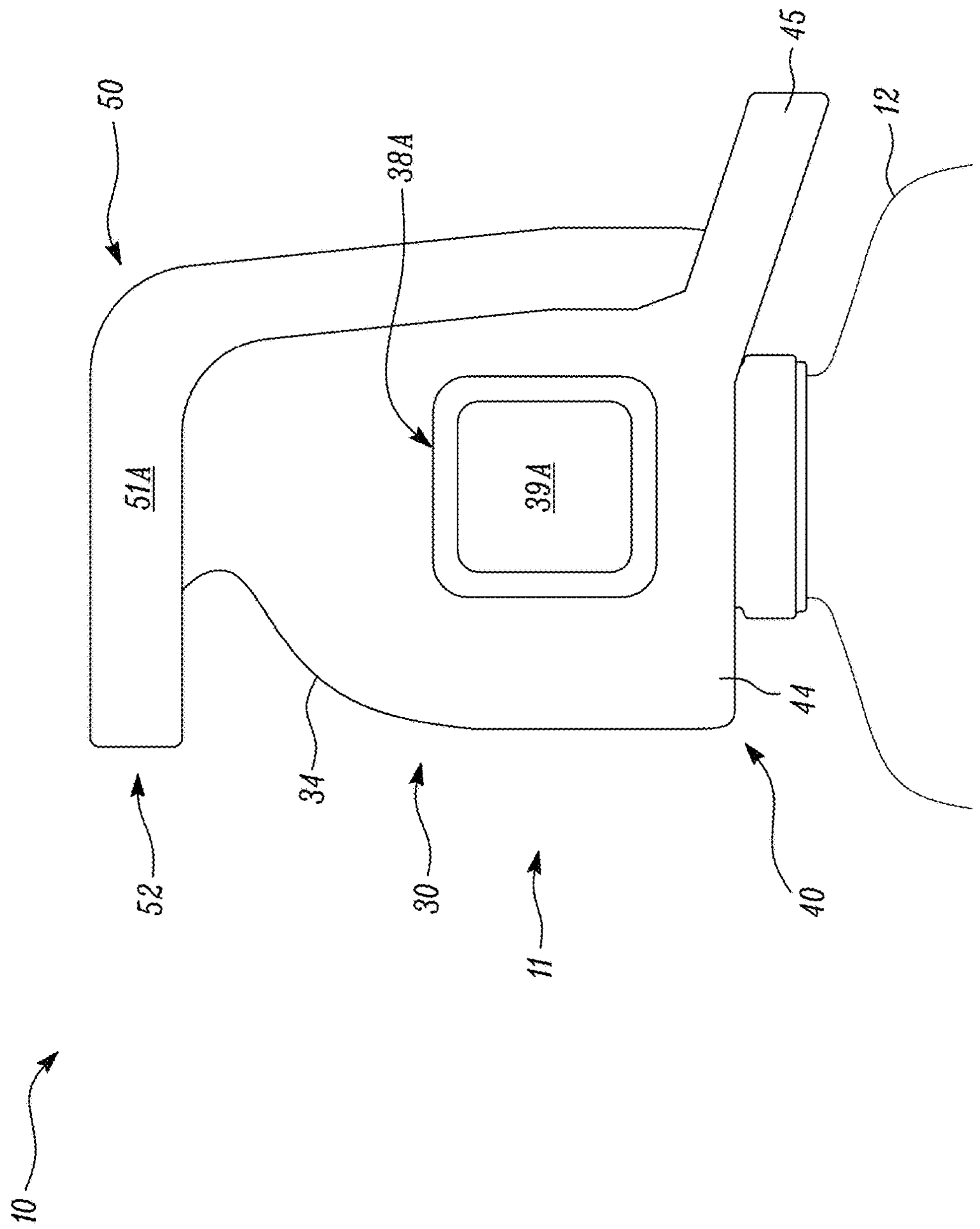
FIG. 7 is a side view of the valve integrated pressure regulator assembly encased within the alternate embodiment of the protective shroud shown attached to a gas cylinder.
Figure 8:
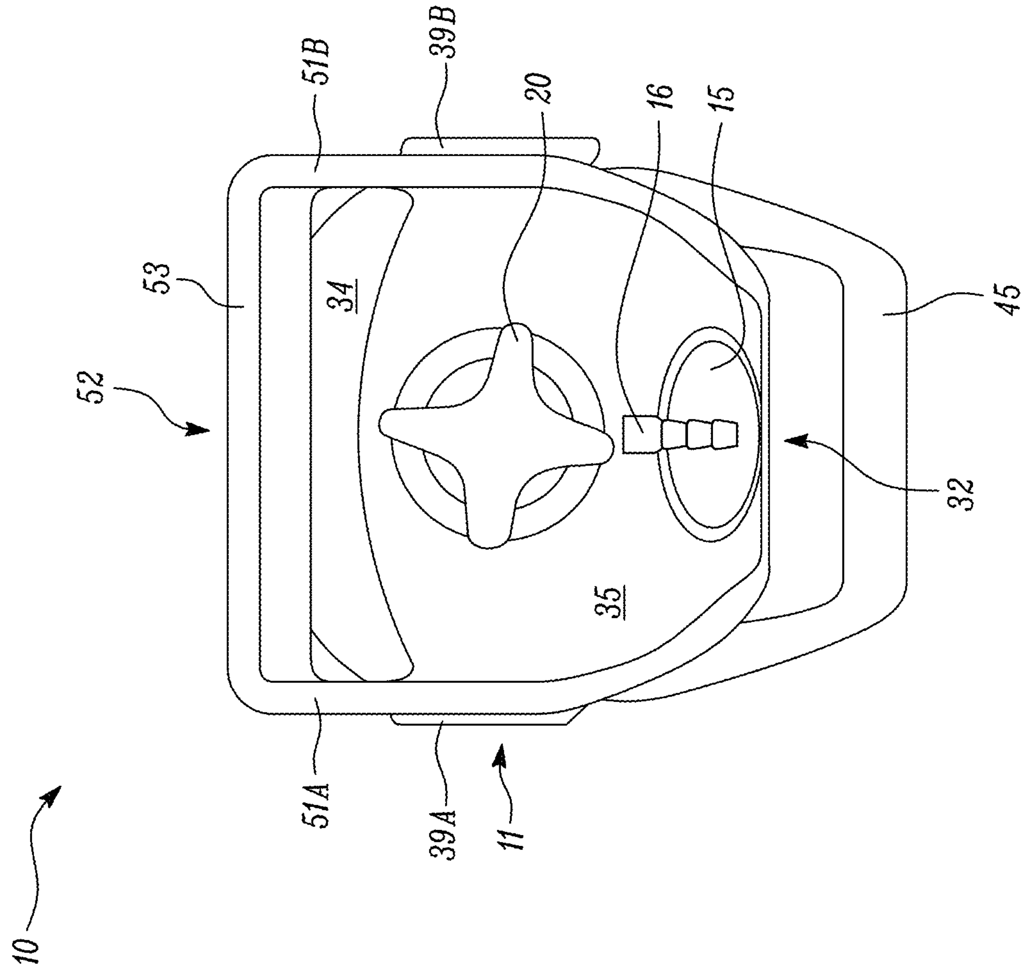
FIG. 8 is a top view of the valve integrated pressure regulator assembly encased within the alternate embodiment of the protective shroud of FIG. 7.

In the alternate embodiment shown in FIGS. 7 and 8, the protective shroud 11 includes a secondary handle 45. The secondary handle 45 has a profile that projects or extends outwardly from bottom section 40 of the protective shroud 11 such as the protective collar 44 or may extend outwardly from a lower portion of front face 32 of the main body section 30. All other components and elements of the protective shroud 11 shown in FIGS. 7-8 are similar to or identical to the corresponding components shown and described with reference to FIGS. 1-6 and for the sake of brevity will not be repeated.

While the present invention has been described with reference to a preferred embodiment or embodiments, it is understood that numerous additions, changes and omissions can be made without departing from the spirit and scope of the present invention as set forth in the appended claims.

What is claimed is:

1. A protective shroud for a valve integrated pressure regulator assembly, the shroud comprising:

a main body section having a front face with a recessed portion and a curved back face, a top section extending from the front face to form a primary handle; and a bottom section with a protective collar;

wherein the recessed portion of the front face has a first port configured to expose a pressure gauge or display from the valve integrated pressure regulator assembly and a second port configured port to receive a gas outlet from the valve integrated pressure regulator assembly; and wherein the top section is circumferentially disposed around a top opening that is sized to receive a control knob of the valve integrated pressure regulator assembly.

2. The protective shroud of claim 1 wherein a clearance between the curved back face and the primary handle is configured to allow an individual to grasp the primary handle from underneath.

3. The protective shroud of claim 1 wherein the top opening is configured to allow an individual to grasp and turn the control knob of the valve integrated pressure regulator assembly.

4. The protective shroud of claim 1 wherein the primary handle further comprises one or more connecting sections and a grip section and wherein the grip section of the primary handle is a curved grip section.

5. The protective shroud of claim 4 wherein the one or more connecting sections and the grip section are in a planar orientation relative to one another and form the uppermost part of the protective shroud.

6. The protective shroud of claim 4 wherein the one or more connecting sections are oriented in a generally orthogonal orientation relative to the to the grip section.

7. The protective shroud of claim 1 wherein the protective collar is an annular collar having a diameter less than a diameter of a compressed gas cylinder to which the valve integrated pressure regulator assembly is attached.

8. The protective shroud of claim 1 wherein the first port on the front face is angled or inclined such that the exposed pressure gauge/display is also at an inclination relative to a central axis of a compressed gas cylinder.

* * * * *